Nov. 9, 1965    M. C. STREET    3,216,119
WORK-CENTERING INDICATOR
Filed Feb. 24, 1964
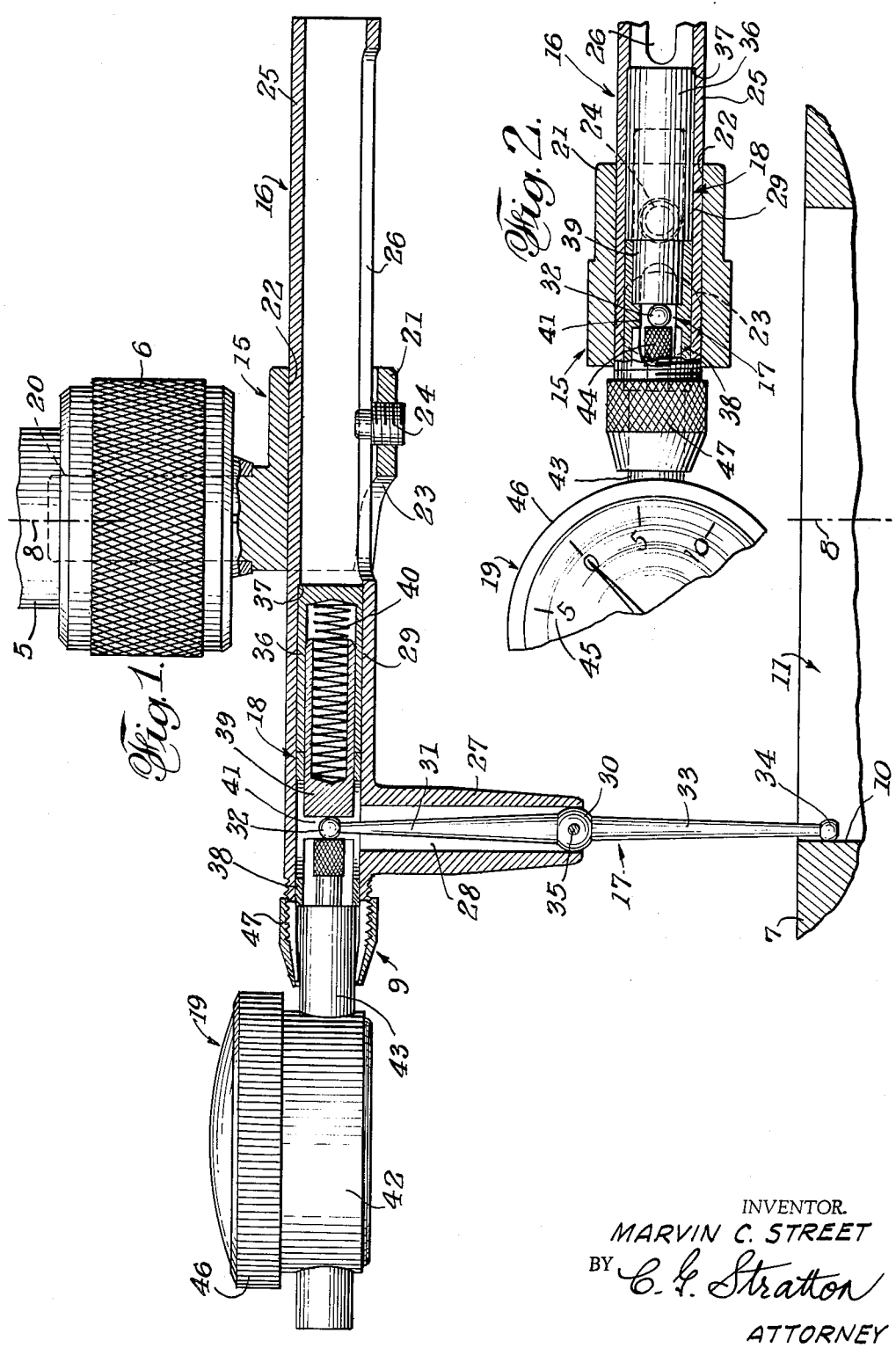
INVENTOR.
MARVIN C. STREET
BY C. L. Stratton
ATTORNEY

United States Patent Office 3,216,119
Patented Nov. 9, 1965

3,216,119
WORK-CENTERING INDICATOR
Marvin C. Street, 2154 E. 83rd St., Los Angeles, Calif.
Filed Feb. 24, 1964, Ser. No. 346,893
4 Claims. (Cl. 33—172)

This invention relates to a work-centering indicator for centering work on the axis of the spindle of machines such as jig borers, milling machines, lathes, and the like.

An object of the invention is to provide indicator means for locating a workpiece on the axis of the tool spindle of a machine by gauging the perimeter of a machined hole, or machined inner or outer perimeter surfaces of a workpiece.

Another object of the invention is to provide an indicator that is adapted to be mounted on the spindle with which the workpiece is to be centered and to be adjustable so as to gauge hole and outer perimeters of various sizes and shapes of the workpiece, the indicator, according to the readings of a dial gauge on the indicator, indicating the concentric or eccentric position of the work, as the same may be, relative to the spindle axis.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, and which is based on the accompanying drawing. However, said drawing merely shows, and the following description merely describes, one embodiment of the present invention, which is given by way of illustration or example only.

In the drawing, like reference characters designate similar parts in the several views.

FIG. 1 is a longitudinal sectional view of an indicator according to the present invention in one adjusted operative position.

FIG. 2 is a fragmentary longitudinal section view on a plane at right angles to the plane of FIG. 1, with the parts adjusted to or coinciding with the axis of the spindle on which it is mounted.

FIG. 1 shows a spindle 5 of a machine such as a drill press, milling machine, lathe or jig borer, the same being provided with the usual tool-gripping chuck 6; and a workpiece 7 which is to be centered on the axis 8 of the spindle. The present indicator 9 is adapted to be mounted on the spindle 5 and to gauge or "feel" the peripheral walls 10 of a hole or groove 11 in said workpiece, as shown, or the outer peripheral walls of said workpiece, whether round, square, oblong or of any other symmetrical shape.

The present indicator 9 comprises, generally, a mounting fitting 15, a beam 16 longitudinally adjustably carried by said fitting, a feeler member 17 carried by said beam to engage the surface or surfaces (such as the surface 10) of a workpiece to be centered on the spindle axis 8, means 18 mounted within the beam 16 and cooperating with a dial gauge 19 on the end of the beam to center the feeler member 17 to provide a normal zero reading of the dial gauge.

The fitting 15 comprises a mounting stud 20 that extends from a sleeve 21 that has a bore 22 normal to said stud. Said sleeve is formed with a recess 23 in one end to allow positioning of the fitting with its stud 20 in a co-axial relationship to the feeler member 17. FIG. 2 shows the fitting in this position. A set screw 24 is provided on said sleeve 21 to lock the adjusted position of the fitting 15 on said beam 16.

The beam 16 is shown as a tube 25 that, for part of its length is formed with a slot 26 for engagement by the set screw 24. Said tube slidingly fits the bore 22 of sleeve 21. Inward of said end, a normal tubular extension 27 is provided on the beam, the bore 28 thereof opening in the bore 29 of the beam tube 25. It is this extension 27 for which the recess 23 of the fitting sleeve is provided, since the feeler member 17 is carried by said extension and, in part, extends in the bore thereof.

The feeler member 17 is formed with a mid portion 30 that is disposed in the lower end of the extension bore 28, an upwardly directed portion 31 that extends in bore 28 from said portion 30 and terminates in a ball end 32 that is located on the center of the bore 29 of tube 25 that bisects bore 28, and a downwardly directed portion 33 that extends from the portion 30 and terminates in a feeler end 34. The ball end 32 and the feeler end 34 are equidistant from a pivot or fulcrum 35 that joins the member 17 to the extension tube 27. Said pivot 35 is on an axis transverse to the axis of bore 29, the feeler member, thereby, being pivotally movable in the plane in which the axes of both bores 28 and 29 reside.

The means 18 is shown as a tubular insert 36 located against an abutment shoulder 37 in the bore 29, a sleeve 38 abutted endwise against the end of the insert 36 and into the hollow interior of which the mentioned ball end 32 extends, a plunger 39 slidably engaged in the bore of the tubular insert 36, and an expansion spring 40 in said insert bore and biasing said plunger in the direction away from the insert 36. As can best be seen in FIG. 2, an intermediate abutment or shoulder portion 41 is formed in the interior of the sleeve 38 to limit projection by the spring 40 of the plunger 39. It will be seen, also, that said shoulder portion 41 has a width that is equal to the diameter of the ball end 32. The shoulder portion 41 is disposed in register with the axial center of the bore 28. Therefore, the plunger 39, when fully projected retains the feeler member 17 in a position that enables the same to move freely on its pivot 35 only in a counter-clockwise direction, i.e., away from the plunger 39. Said feeler member can move clockwise only by a force imposed on the end 34 to overcome the bias of spring 40.

The dial gauge 19 is generally conventional, the same having a body 42 provided with a radial extension 43 from which extends an actuator 44 which actuates a pointer that is readable in connection with a dial 45 that, in this case, is showing as the zeroizing type in that the same may be rotated to a zero position, with respect to the indicator pointer, by means of a rotational bezel 46.

The beam tube 25, at its end adjacent the extension 27, is provided with a chuck 47 in which the indicator extension 43 is received, the end thereof abutting the sleeve 38. Said sleeve is so proportioned that the same locates the indicator 19 so that the actuator 44 may project when the feeler member 17 moves clockwise and be retracted when said member 17 moves counter-clockwise. Either movement (to one or the other side of zero on the dial 45) will reflect a similar but opposite movement of the feeler end 34. In practice the actuator 44 normally abuts the ball 32 but can project and retract from this normal position.

It will be clear that after the tool has been set according to the size of hole or workpiece perimeter, that by slowly rotating the tool around the axis 8 which is the true axis of the spindle 5, the feeler end 34 will be moved by a wall or walls 10 of a hole or annular groove that is in an eccentric position and that such movement will be readable on the indicator dial. The workpiece may be shifted, accordingly, until the dial pointer remains on zero through a 360° traverse of the feeler end 34 to indicate accurate concentricity of the wall 10 on axis 8. The above operation is the same for an outer diameter or for outer symmetrical surfaces, except that the dial pointer, until concentricity is achieved, moves to the other side of zero on the dial.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. An indicator for centering a workpiece having perimeter walls on the axis of a tool spindle that comprises:
   (a) a tubular fitting adapted for mounting on said spindle to rotate therewith,
   (b) a tubular beam member formed with an elongated slot along a portion of its length and including a depending tubular extension having its axis normal to the axis of said beam,
   (c) a dial gauge assembly having an extension secured in an end of said tubular beam with its actuator in axial alignment therewith,
   (d) an adjusting means carried by said tubular fitting and extending into said elongated slot in said beam member to maintain said beam member against rotation and secure the same in adjusted position,
   (e) an elongated feeler member pivotally mounted medially of its length and at the free end portion of said depending tubular extension for movement in the plane in which the beam is disposed, said feeler member having one end extending into said tubular beam and engaging one side of said dial gauge actuator and the opposite end adapted for engagement with the perimeter of a workpiece,
   (f) a spring urged plunger in said tubular beam engaging the opposite side of said dial gauge actuator, and
   (g) a stop member positioned in said tubular beam in the path of movement of said spring urged plunger to limit the path of travel of said plunger in one direction for maintaining said gauge in a predetermined initial position.

2. The structure of claim 1 characterized in that the spring urged plunger in the tubular beam and the stop member positioned in said tubular beam in the path of movement of said spring urged plunger are contained in a sleeve fixed in the tubular beam.

3. The structure of claim 1 characterized in that the spring urged plunger in the tubular beam and the stop member positioned in said tubular beam in the path of movement of said spring urged plunger are contained in a sleeve fixed in the tubular beam and an inwardly projecting shoulder is formed within the tubular beam to provide a stop for positioning said sleeve.

4. The structure of claim 1 characterized in that the adjusting means carried by the tubular fitting and extending into the elongated slot in the beam member to secure the beam member in adjusted position comprises a set screw threaded into said tubular fitting and having a portion extending into the elongated slot in said beam and a second portion adapted to engage the outer surface of the tubular beam along the marginal walls defining the slot.

References Cited by the Examiner
UNITED STATES PATENTS

| 1,299,838 | 4/19 | Keller | 33—172 |
| 2,098,838 | 11/37 | Rusnak | 33—172 |
| 2,493,332 | 12/50 | Aubin | 33—172 |
| 2,900,733 | 8/59 | Zelnick | 33—172 |

FOREIGN PATENTS

| 125,260 | 8/47 | Australia. |

ISAAC LISANN, *Primary Examiner.*